United States Patent [19]

Frantzreb, Sr.

[11] 3,878,354

[45] Apr. 15, 1975

[54] WELDING GUN CHUCK ASSEMBLY

[75] Inventor: John G. Frantzreb, Sr., Peoria, Ill.

[73] Assignee: Caterpillar Tractor Company, Peoria, Ill.

[22] Filed: June 1, 1973

[21] Appl. No.: 366,129

[52] U.S. Cl. .................................. 219/74; 219/75
[51] Int. Cl. ............................................. B23k 9/16
[58] Field of Search ............................ 219/74-76, 219/130, 137; 228/20

[56] References Cited
UNITED STATES PATENTS

| | | |
|---|---|---|
| 3,018,360 | 1/1962 | Engel .............................. 219/75 X |
| 3,514,567 | 5/1970 | Strang ................................ 219/75 |
| 3,604,889 | 9/1971 | Rohrberg ........................ 219/75 X |
| 3,798,409 | 3/1974 | Troyer et al. ......................... 219/75 |

Primary Examiner—C. L. Albritton
Attorney, Agent, or Firm—Phillips, Moore, Weissenberger, Lempio & Strabala

[57] ABSTRACT

A chuck assembly including electrode stickout guide means and gas flow directing nozzle means for use with a welding gun having electrode stickout is provided. The chuck assembly provides gas flow passages for shielding gas and fume extraction, and further provides maximum protection of the chuck assembly components for weld spatter. The guide means are readily interchangeable for use with gasless or gas shielded welding operations.

9 Claims, 5 Drawing Figures

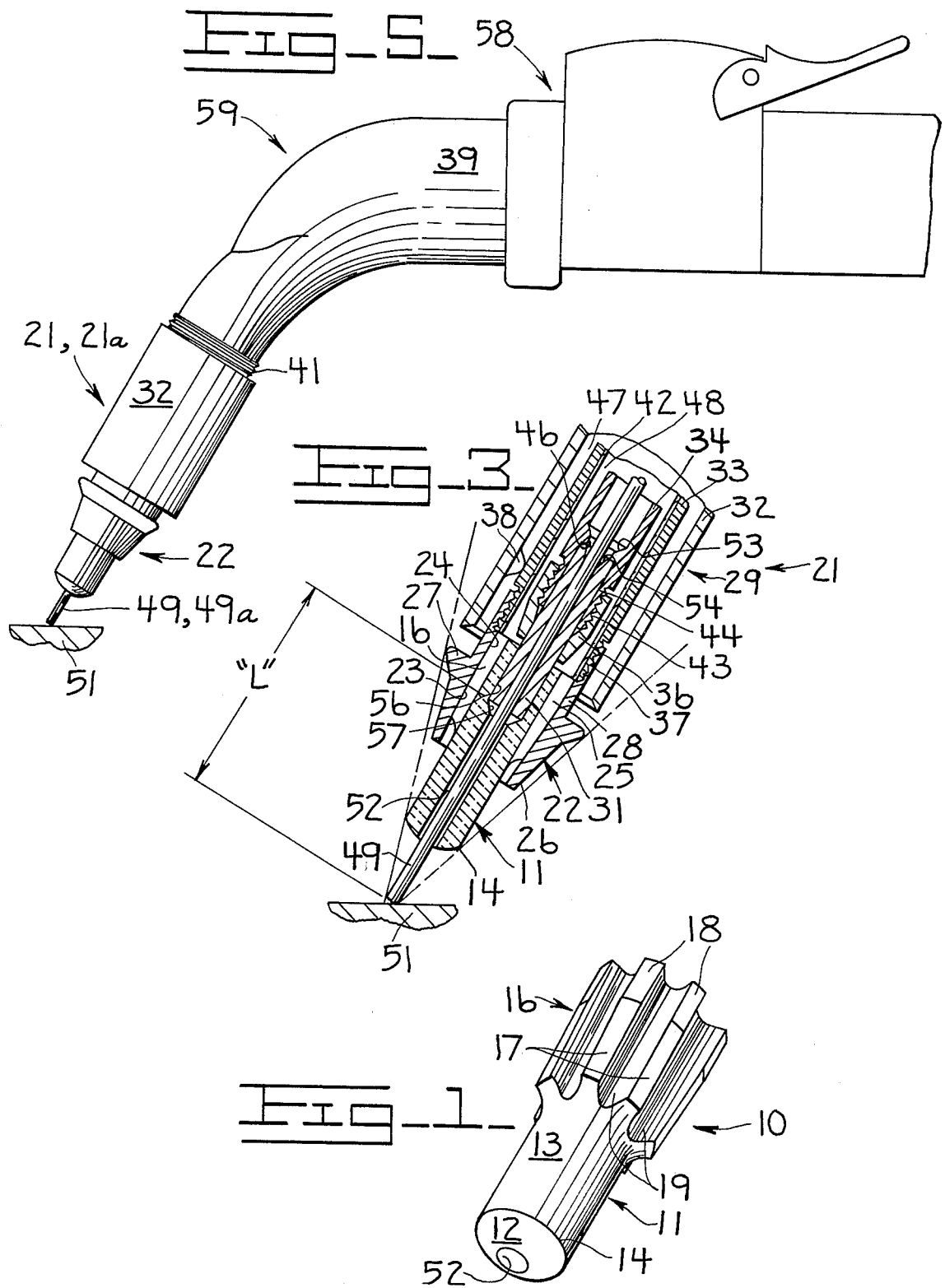

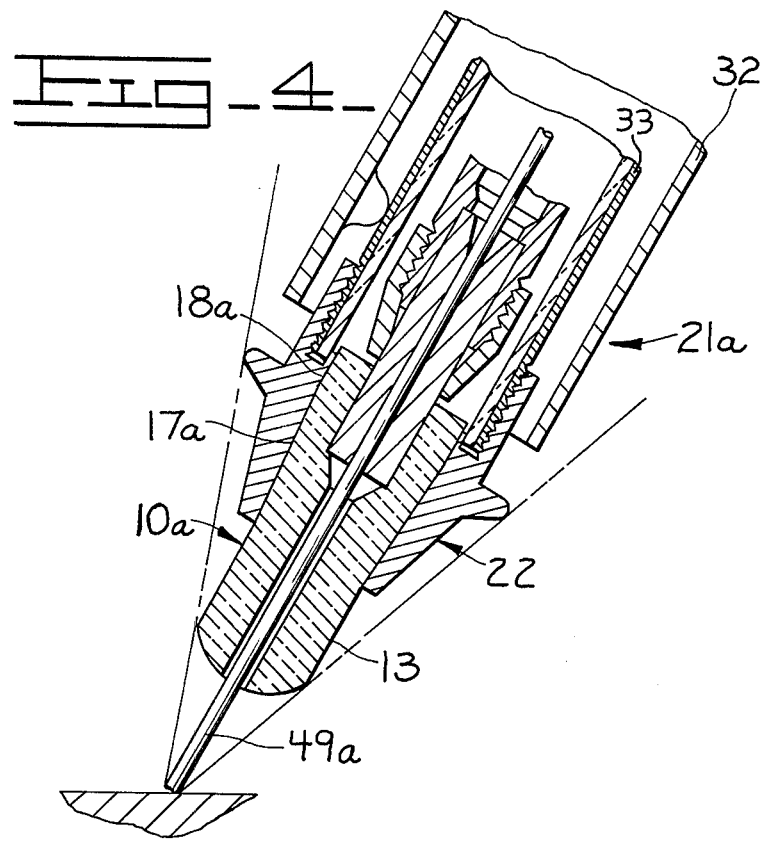
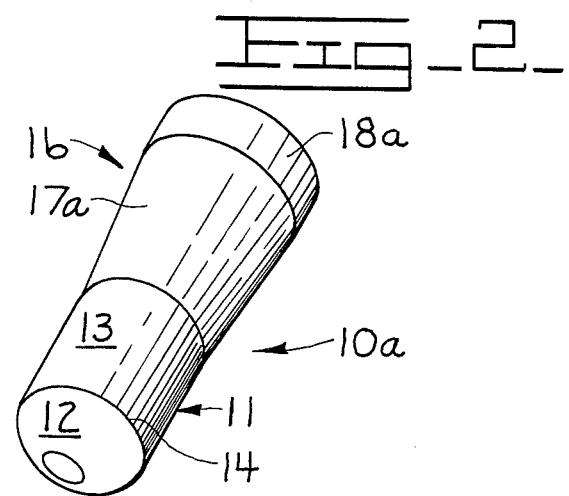

WELDING GUN CHUCK ASSEMBLY

BACKGROUND OF THE INVENTION

This invention relates to an electric arc welding gun. This invention particularly relates to a chuck assembly, including nozzle and guide means, for conventional electric arc welding guns with "electrode stickout" which is readily adaptable for use in gasless or gas-shielded welding operations (with or without fume extraction) and which provides a weld-spatter protection zone around the nozzle. Many arc welding operations currently performed employ an extended "electrode stickout" which permits the flow of welding current through this stickout to produce a desired resistance heating of the electrode before it is subjected to the heat of the welding arc. The term "electrode stickout" conventionally signifies that portion of the electrode which sticks out beyond the contact tip or other conducting means of the welding device employed for supplying welding current to the electrode.

While the use of arc welding devices with this electrode stickout has substantially broadened arc welding applications, a number of problems encountered in these applications attributable to electrode stickout have yet to be satisfactorily resolved.

In general, electric arc welding devices utilizing continuously fed weld wire are provided with a head having encircling electrically conducting means, such as a contact tip. This contact tip is disposed at a suitable distance from the weld end or tip of the weld wire to obtain the desired degree of electrical resistance in the weld wire. Typically, this weld wire is stored in a coil, and an unsupported wire will gyrate as it is fed beyond the contact tip due to the cast and helix of this wire, causing poor orientation with the weld joint. It is therefore customary to provide the electrode stickout with guide means. Preferably, these guide means are of electrically resistant material, such as the ceramic-like materials disclosed in U.S. Pat. No. 3,025,387, of common assignment herewith, and are provided with means for reducing thermal shock thereto during operation, such as the jacket of heat conductive material disclosed in U.S. Pat. No. 3,089,022, of common assignment herewith. Other patents of interest with respect to the present invention are U.S. Pat. Nos. 2,510,205 to Baird, 2,612,584 to Morrissey, 2,628,301 to Dahl, 2,721,249 to Landis et al., 2,827,550 to Unrath, 2,965,746 to Cresswell, 2,992,320 to Hill, and 3,018,360 to Engel.

Such electric arc welding devices have broad application in both gasless and gas-shielded welding operations. However, known electric arc welding devices employing electrode stickout have frequently proved to be unsatisfactory, particularly when used in conjunction with gas-shielded welding operations.

In a gas-shielded welding operation, an inert gas is supplied to the arc welding zone to shield the weld from atmospheric contamination. It is therefore necessary that the weld wire tip and weld zone be substantially within the gas shield, and means must be provided in the welding device to ensure this result. Prior art means for shielding an arc welding zone when electrode stickout is employed have frequently resulted in erratic shielding of the zone, and contamination of the weld.

Further, fume-extraction devices for operator relief from noxious smoke accompanying the gas-shielded welding operation are more and more frequently being employed with welding guns in these welding operations. It is therefore desirable that means be provided, particularly for use in conjunction with electrode stickout, to satisfy fume extraction flow requirements in welding guns.

An additional problem associated with gas-shielded welding operations, particularly when carbon dioxide is employed, is weld spatter. The tendency of the various elements associated with the weld head, such as a gas-flow directing nozzle, to become coated with spatter from the arc welding process, thereby interfering with the operation of the welding device, is well-known. Typically, prior art weld head components associated with electrode stickout welding operations have been very susceptible to weld spatter, and difficult to clean. Such weld head components, especially the guide and nozzle means, have also been frequently difficult to remove from the welding device for cleaning or replacement.

The difficulty of removal of guide means, nozzle means, and the like employed with electrode stickout welding operations has also interfered with rapid welding operations when it has been desired to change from a gas-shielded operation to a gasless welding operation. Frequently, numerous specialized parts have been required for this changeover, necessitating stocking a large number of parts to provide for this contingency, while the aforesaid difficulty of removal of these parts has substantially slowed down the change-over, resulting in increased labor costs.

It is therefore an object of this invention to provide a chuck assembly, including guide and nozzle means for an electric arc welding device with electrode stickout whereby the arc welding zone is effectively protected from atmospheric contamination during gas-shielded welding operation.

It is another object of this invention to provide a chuck assembly, including guide and nozzle means, for an electric arc welding device with electrode stickout which will satisfy fume extraction flow requirements when the welding device is used in conjunction with fume extraction devices.

It is an additional object of this invention to provide a chuck assembly, including guide and nozzle means, for an electric arc welding device with electrode stickout which is relatively less susceptable to weld spatter, and thereby has an extended service life.

It is a further object of this invention to provide a chuck assembly, including guide and nozzle means, for an electric arc welding device with electrode stickout which is readily removable from the welding device for cleaning or replacement.

It is yet a further object of this invention to provide a chuck assembly, including guide and nozzle means, for an electric arc welding device with electrode stickout which may be used with either gas-shielded or gasless welding operations and is readily interchanged.

BRIEF SUMMARY OF THE INVENTION

In accordance with the objects of this invention, a chuck assembly, including guide and nozzle means, is provided for use with a conventional electric arc welding gun with electrode stickout. Broadly, the invention comprises guide means for the electrode stickout which, in a preferred embodiment, is provided with longitudinal channels on the proximal portion thereof, and nozzle means which retentively support said guide means within the weld head. The nozzle means and guide means, in conjunction, provide passages for gas flow around the periphery of the distal end of said guide means when used in gas-shielding operations. Preferably, a sleeve means is removably secured to the welding gun and disposed about and secured to the weld head components, including the nozzle and guide means, to form an annular passageway therewith, wherethrough fumes are extracted from the arc welding zone. In an alternate embodiment for use in gasless welding operations, the proximal portion of the guide means is provided with a smooth surface, and is similarly retentively supported within said nozzle means; the smooth, channelless surface blocks the gas flow passages provided within the weld head.

BRIEF DESCRIPTION OF THE DRAWINGS

FIG. 1 is a perspective view of the preferred embodiment of the guide means of the invention for use with gas-shielded welding operations.

FIG. 2 is a perspective view of an alternate embodiment of the guide means of the invention for use with gasless welding operations.

FIG. 3 is a sectional side view of a weld head chuck assembly including the nozzle means and preferred guide means of the invention for use in gas-shielded welding operations.

FIG. 4 is a similar view but including alternate guide means for use in gasless welding operations; and FIG. 5 is a side view of a welding gun including the guide means and nozzle means of the invention in operating position.

DETAILED DESCRIPTION OF THE INVENTION

With particular reference to FIGS. 1 and 2, guide means 10, for use in gas-shielded welding operations, and guide means 10a, for use in gasless welding operations, are provided with a forwardly disposed nose portion 11 having a conical head 12 and cylindrical forward extension 13 joined at edge 14. Rearwardly disposed enlarged portion 16 includes conical forwardly disposed surfaces 17 and 17a, and cylindrical rearwardly disposed surfaces 18 and 18a. Forwardly disposed surface 17 and rearwardly disposed surface 18 are intersected by a plurality of longitudinally disposed shielding-gas directing grooves or flutes 19 in guide means 10 (FIG. 1).

Preferably, guide means 10 and 10a are comprised of electrically resistant material such as a high melting point ceramic or similar materials. Suitable materials include zirconium oxide, alumina, and silicon nitride. Advantageously, guide means 10 and 10a comprised of such materials are provided with means to reduce thermal shock, such as the heat-conductive jacket means disclosed in U.S. Pat. No. 3,089,022.

With particular reference to FIGS. 3 and 5, guide means 10 is shown retained within weld head 21 by nozzle means 22. Nozzle means 22 is preferably comprised of a heat-conducting material such as copper, and thereby serves to lessen thermal shock experienced in ceramic guide means 10 during welding. Nozzle means 22 is provided with a forward conical bore 23 and a rearward cylindrical bore 24, the surfaces of which conform to and intimately contact forwardly disposed surface 17 and rearwardly disposed surface 18 of guide means 10, respectively, thereby defining a plurality of shielding-gas directing passages 25. Nozzle means 22 further includes forwardly directed conical outer surface 26, circumferential fume-directing lip 27, and a reduced diameter cylindrical rearward portion 28.

The chuck assembly generally indicated at 29 provides means for attaching guide means 10, nozzle means 22 and electrically conducting contact tip 31 to the welding gun, and includes sleeve 32, tubular conduit 33, adapter 34 and adjustment nut 36. Enlarged portion 16 of guide means 10 is encirclingly contained within nozzle 22, which in turn is removably secured to tubular conduit 33 as by threads 37 at the forward portion thereof. Tubular conduit 33 is supportively retained within chuck assembly 29 by a plurality of radially disposed protrusions 38 located on the inner surface of sleeve 32, which in turn is adapted to be removably secured to welding gun housing 39, as by a plurality of threads 41 (FIG. 5). Conduit 33 is preferably lined with an insulating sleeve 42.

Electrically conducting adapter 34 is provided with external threads 43 in a longitudinally slotted forward extension 44 thereof, and tightly contains contact tip 31 within counterbore 46 provided in adapter 34, for example, by internally threaded adjustment nut 36. Adapter 34 extends rearwardly through welding gun housing 39 where it is insulatingly secured within the weld gun (not shown).

When assembled, the components of chuck assembly 29 provide an annular fume evacuating passage 47, formed by the concentric disposition of tubular conduit 33 and sleeve 32, and also provide annular shielding-gas flow passage 48, formed by the concentric disposition of insulating sleeve 42 and adapter 34.

A continuously fed weld wire or consumable electrode 49 (shown contacting workpiece 51) is guided within contact tip 31, and extends beyond contact tip 31 for an electrode stickout distance L. Within this electrode stickout, weld wire 49 is loosely supported within central passage 52 of guide means 10. However, weld wire 49 is sufficiently tightly contained within passage 52 to provide control of the weld wire tip, yet permit weld wire 49 to slide through passage 52 freely.

Preferably, the passages provided within the chuck assembly and guide means through which the weld wire is threaded during initial setting-up of the welding gun are suitably conformed to facilitate the threading of weld wire 49. For example, both adapter 34 and contact tip 31 may be provided with conical internal surfaces 53 and 54, respectively; also, guide means 10 may be provided with counter bore 56 having conical surface 57. In the latter instance, the forward extremity of contact tip 31 is received in counter bore 56 to provide a serially arranged overlapping relation between contact tip 31, and guide means 10. This relationship allows simple modification of the depth of counter bore 56 and length of contact tip 31 to provide various electrode stickout distance L to meet the parameters of various operating conditions. For example, it is contemplated that weld wire 49 may be of the gas-flux cored type allowing dual gas usage, such as a mixture of $CO_2$ and argon; however, if a single gas is to be used, it may be desirable to modify the depth of counterbore 56 and the length of contact tip 31 to vary the electrode stickout distance.

With reference to FIGS. 4 and 5, guide means 10a is shown associated with the components of weld head 21 described above, including nozzle means 22. When guide means 10a is positioned within nozzle means 22, surfaces 13, 17a and 18a of guide means 10a substantially block shielding-gas flow passage 48, and provide a weld head 21a suitable for use in gasless welding operations. For conversion from gas-shielded welding operations employing weld head 21 to gasless operations employing weld head 21a, nozzle means 22 is detached from tubular conduit 33, and guide means 10 replaced with guide means 10a; nozzle means 22 is then reattached to tubular conduit 33. Typically, weld wire 49 would then be replaced by a gasless flux cored welding wire 49a.

In gas-shielded welding operation, actuation of control handle 58 of arc welding gun 59, preferably simultaneously, initiates (a) the transmission of electrical current through adapter 34, contact tip 31 and weld wire 49 to workpiece 51, (b) the flow of a shielding gas such as $CO_2$ or argon, or a mixture thereof through annular passage 48 and shielding-gas directing passages 25 to the arc welding zone, and (c) the application of a vacuum to the fume evacuating passage 47 for removal of noxious smoke and gases produced during the weld operation.

Owing to the relationship of the gas directing passages 25 and smooth cylindrical forward extension 13 of guide means 10, improved gas shielding of the workpiece is realized. Further, the interrelationship of shielding-gas flow passage 48 and fume evacuation passage 47 is enhanced by the external relationship of nozzle means 22 and lip 27 to passage 47, as more fully described in application Ser. No. 107,097 filed Jan. 18, 1971, of common assignment herewith. High fume extraction efficiency is thereby realized, and visibility and control of the wire tip by the operator are substantially increased.

As indicated in FIG. 3, edge 14 of guide means 10 forms with the tip of weld wire 49 a cone-shaped weld spatter protection zone. Importantly, the components of weld head 21 other than conical head 12 of guide means 10 are located within this spatter protection zone, and thus the sticking of spatter particles to these components is substantially eliminated, thereby extending the service life of these components. Additionally, the ceramic material comprising guide means 10 is substantially non-wettable by weld spatter, which further reduces spatter accumulation on the exposed portions of guide means 10, thereby reducing frequency of cleaning.

What is claimed is:

1. A chuck assembly for a welding gun including nozzle means detachably mounted within said chuck assembly and guide means for guiding the electrode stickout portion of a weld wire employed with said welding gun seated within said nozzle means, said guide means extending substantially beyond said nozzle in a direction anteriorly of said chuck assembly to guide and support the weld wire as it extends beyond said nozzle.

2. The chuck assembly of claim 1, wherein the guide means include a rigid body having a plurality of longitudinal channels therein, said channels and said nozzle means defining a plurality of passages between said guide means and said nozzle means when said guide means are seated within said nozzle means.

3. A chuck assembly for a welding gun employable in gas-shielded welding operations, said chuck assembly including: fume extraction means for extracting product fumes of said welding operations comprising a sleeve mounted on said welding gun and disposed around a tubular conduit extending through said gun to form an annular passageway therewith; nozzle means detachably mounted on said tubular conduit, and guide means extending substantially beyond said nozzle in a direction anteriorly of said chuck assembly, said guide means guiding the electrode stickout portion of a weld wire extending axially through said welding gun.

4. The chuck assembly of claim 3 wherein said guide means include a rigid body having a plurality of longitudinal channels therein, said channels and said nozzle means defining a plurality of passages between said guide means and said nozzle means when said guide means are seated within said nozzle means.

5. The chuck assembly of claim 4, wherein said nozzle means include a substantially conically shaped rigid body having a lip around the outer circumference of the base thereof.

6. The chuck assembly of claim 5, wherein the longitudinal channels of said guide means are disposed within an enlarged posterior portion thereof, and the surface of said enlarged posterior portion substantially conforms to said conically shaped rigid body of said nozzle means defines a substantially conically-shaped area when said guide means are seated within said nozzle means.

7. The chuck assembly of claim 6, wherein the rigid body of said guide means is comprised of a ceramic-like material.

8. The chuck assembly of claim 5, wherein the rigid body of said nozzle means is comprised of a heat-transferring material.

9. A chuck assembly for a welding gun employable in gasless welding operations, said chuck assembly including fume extraction means for extracting product fumes of said welding operations comprising sleeve means detachably mounted on said welding gun and disposed around a tubular conduit extending through said gun to form an annular passageway therewith; nozzle means detachably mounted on said tubular conduit including a substantially conically-shaped rigid body having a lip around the outer circumference of the base thereof; and guide means for guiding the electrode stickout portion of a weld wire employed with said gun seated within said nozzle means, said guide means including a rigid body having a substantially conically-shaped enlarged posterior portion substantially conforming to said substantially conically-shaped rigid body of said nozzle means, and said enlarged posterior portion having a substantially smooth surface thereof.

* * * * *

UNITED STATES PATENT OFFICE
CERTIFICATE OF CORRECTION

PATENT NO. : 3,878,354
DATED : April 15, 1975
INVENTOR(S) : John G. Frantzreb, Sr.

It is certified that error appears in the above-identified patent and that said Letters Patent are hereby corrected as shown below:

On the Title Page, Item [73], change the spelling of the assignee's corporate name from "Caterpillar Tractor Company" to --- Caterpillar Tractor Co. ---.

Signed and Sealed this twenty-ninth Day of July 1975

[SEAL]

Attest:

RUTH C. MASON
*Attesting Officer*

C. MARSHALL DANN
*Commissioner of Patents and Trademarks*